Aug. 9, 1966

A. N. WARD ETAL 3,265,365

MANUFACTURE OF ARTICLES FROM CURABLE MATERIAL

Filed Jan. 22, 1963

Inventors:
Albert Nelson Ward
John William Watson
Richard Charles Foster
Peter Ford
by Benj. T. Raueber
Attorney

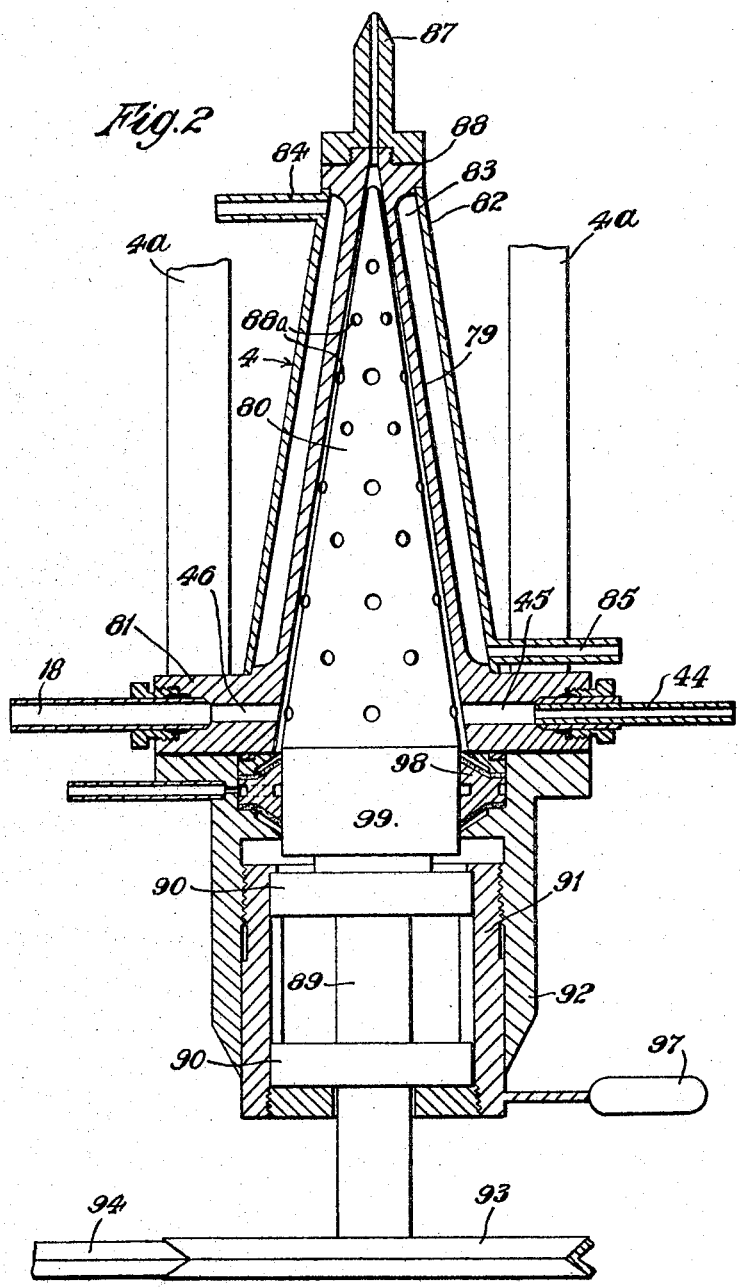

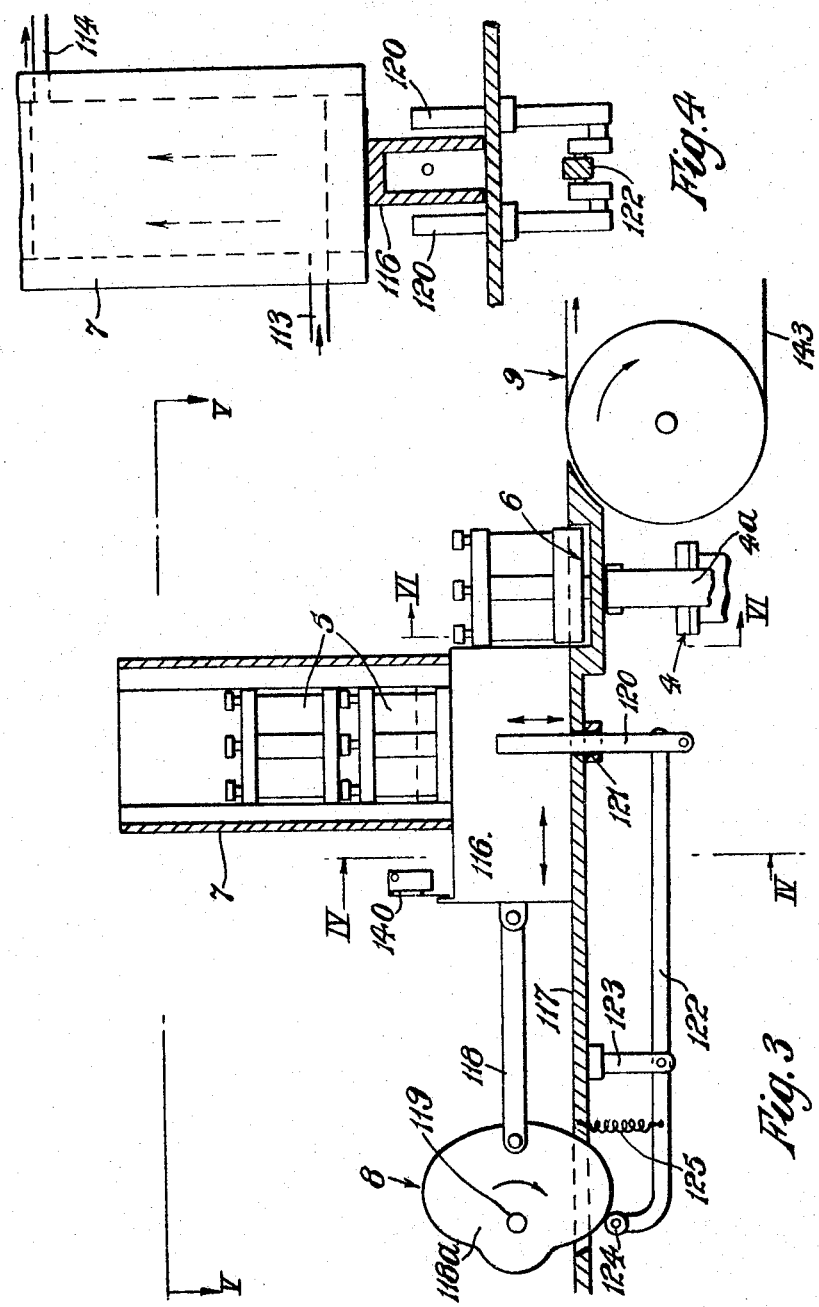

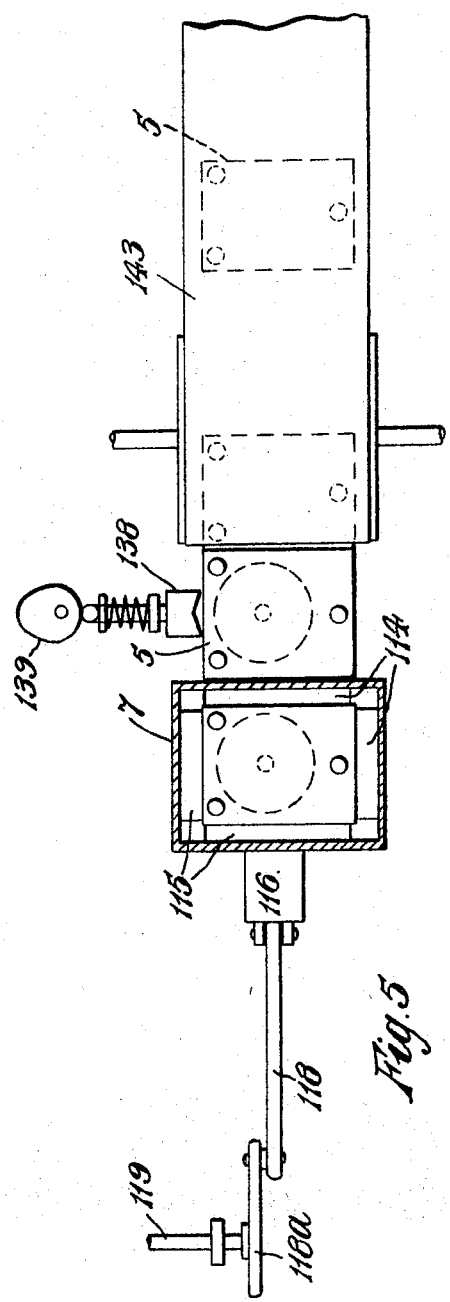

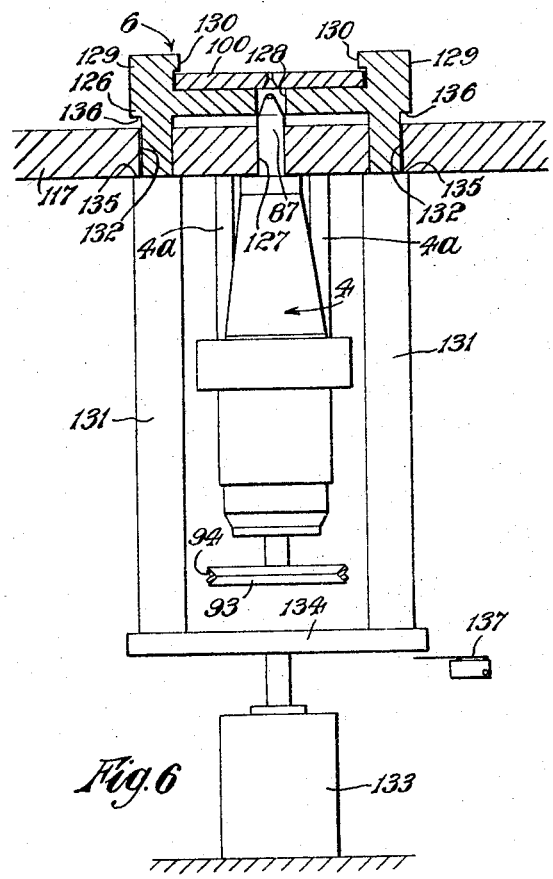
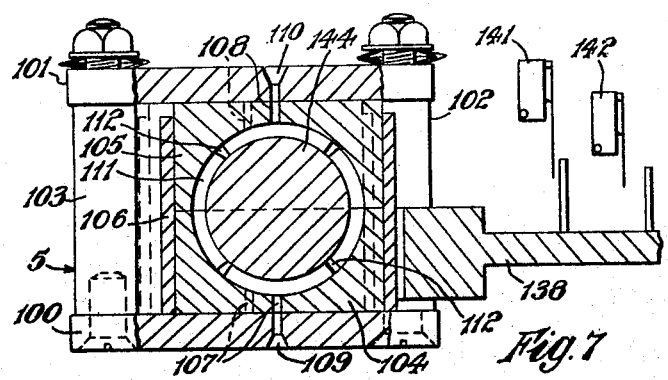

United States Patent Office 3,265,365
Patented August 9, 1966

---

3,265,365
MANUFACTURE OF ARTICLES FROM
CURABLE MATERIAL
Albert Nelson Ward, Castle Bromwich, John William Watson, Sutton Coldfield, and Richard Charles Foster and Peter Ford, Birmingham, England, assignors to Dunlop Rubber Company Limited, London County, England, a British company
Filed Jan. 22, 1963, Ser. No. 253,078
Claims priority, application Great Britain, Feb. 8, 1962, 4,816/62
6 Claims. (Cl. 259—8)

This invention relates to the manufacture, from curable material, of articles, for example, golf balls, loom pickers and flexible mechanical components for motor vehicles.

Difficulty has been experienced in the handling of cross-linking agents to be mixed with liquid curable polyurethane prepolymer in the manufacture of golf balls having an external cover of cured polyurethane, the cross-linking agent, which is solid at room temperatures, tending to solidify or decompose in the supply pipes to cause blockages therein so that either the apparatus becomes inoperative or the specified proportions of cross-linking agent and liquid curable polyurethane prepolymer are not achieved in the final mixture.

This difficulty may also be met in the manufacture of articles other than golf balls and using other materials than those specified in the preceding paragraph and it is an object of the present invention to provide apparatus for the manufacture of articles from curable material which will overcome, or considerably reduce this difficulty.

It is a further object of the invention to provide apparatus for the pre-treatment of the materials for the covering of a golf ball core, for the pre-forming of the ball, the partial curing of the ball and the final curing and moulding of the ball.

According to the invention apparatus for the manufacture of articles from curable material comprises a first container for liquid curable material, a mixing apparatus, a pump for supplying curable material from the container to the mixing apparatus, a second container for a cross-linking agent, a pump for the cross-linking agent, a flow pipe connected from the pump to the second container, a throttling valve in the flow pipe to throttle the flow of cross-linking agent back to the second container, a supply pipe connected at one end to the mixing apparatus and connected at the other end to the flow pipe at a position between the throttling valve and the pump, and means for raising the temperature of the cross-linking agent to render it liquid in form and for maintaining this temperature.

Preferably supply controlling means, which may take the form of a pump, is utilised to deliver controlled quantities of cross-linking agent along the supply pipe to the mixing apparatus. Preferably also a straining device is provided to strain the cross-linking agent as it leaves the container provided therefor.

The cross-linking agent may be raised to and maintained at operating temperature either by jacketting the second container, strainer, circulating pump, throttling valve, metering pump and their connecting pipework either separately or in groups and circulating a heated fluid through the jacket spaces, or by immersing the container, strainer, pumps, throttling valve and pipework in a common bath of heated liquid. In either case, the temperature of the external fluid is maintained constant at the operating temperature of the cross-linking agent.

The apparatus may be for the covering of pre-formed golf ball cores with polyurethane and comprise a magazine for a plurality of golf ball pre-forming moulds, means for feeding the moulds one-at-a-time to an outlet from the mixing apparatus, means for partially curing coated balls in the moulds and curing apparatus and moulding means for, respectively, finally curing the pre-cured balls and providing a pattern on their external surface.

The term "polyurethane pre-polymer" is used herein for convenience to distinguish the starting material from the cured polyurethane in the golf ball cover. However, it will be understood that the polyurethane pre-polymer is preferably a liquid at, or somewhat above, room temperature. The production of polyurethane pre-polymers is well known.

Curing the pre-polymer is preferably effected by means of a cross-linking agent, e.g., a substance containing at least two active hydrogen atoms per molecule, e.g., diols, diamines, etc., but water is preferably not used as a cross-linking agent since, as is known, it reacts with terminal isocyanate groups to evolve carbon dioxide; this is undesirable if a good finish is to be obtained on the golf ball cover.

The polyurethane pre-polymer/cross-linking agent mixture may be used alone or may be admixed with other materials, for example, mineral oils, fillers and colouring materials.

One example of prepolymer is polytetrahydrofuran/tolylene diisocyanate prepolymer made by E. I. du Pont de Nemours & Co. (U.S.A.). This is sold under the trade name of Adiprene L the type known as L167 being preferred but L100 and L213 may be used. One example of cross-linking agent is methylene bis (orthochloroaniline) (MOCA).

Other examples of pre-polymers which may be used with the apparatus according to the invention are polypropylene glycol/tolylene diisocyanate or polyethylene glycol adipate/tolylene diisocyanate, the polyethylene glycol adipate being sold, under the trade name Desmophen (registed trademark) 2000.

Other examples of cross-linking agents for use with the pre-polymers referred to above are methylene bis aniline, $3,3^1$ dichloro $4,4^1$ diaminodiphenyl or $4,4^1$ diaminodiphenyl.

One embodiment of the invention will now be described, by way of example, with reference to the accompanying drawings in which:

FIGURE 2 is an axial cross-sectional view of mixing apparatus forming part of the apparatus shown in FIGURE 1;

FIGURE 3 is a cross-sectional view of another part of the apparatus showing means for feeding golf ball moulds into and out of a mould filling position above the mixing apparatus;

FIGURE 4 is a cross-sectional view on line IV—IV of the apparatus shown in FIGURE 3;

FIGURE 5 is a cross-sectional view on line V—V of the apparatus shown in FIGURE 3;

FIGURE 6 is a cross-sectional view on line VI—VI of the apparatus shown in FIGURE 3 and on a larger scale than is shown in FIGURE 3;

FIGURE 7 is a vertical cross-sectional view of a golf ball mould forming a part of the apparatus.

Figure 1:
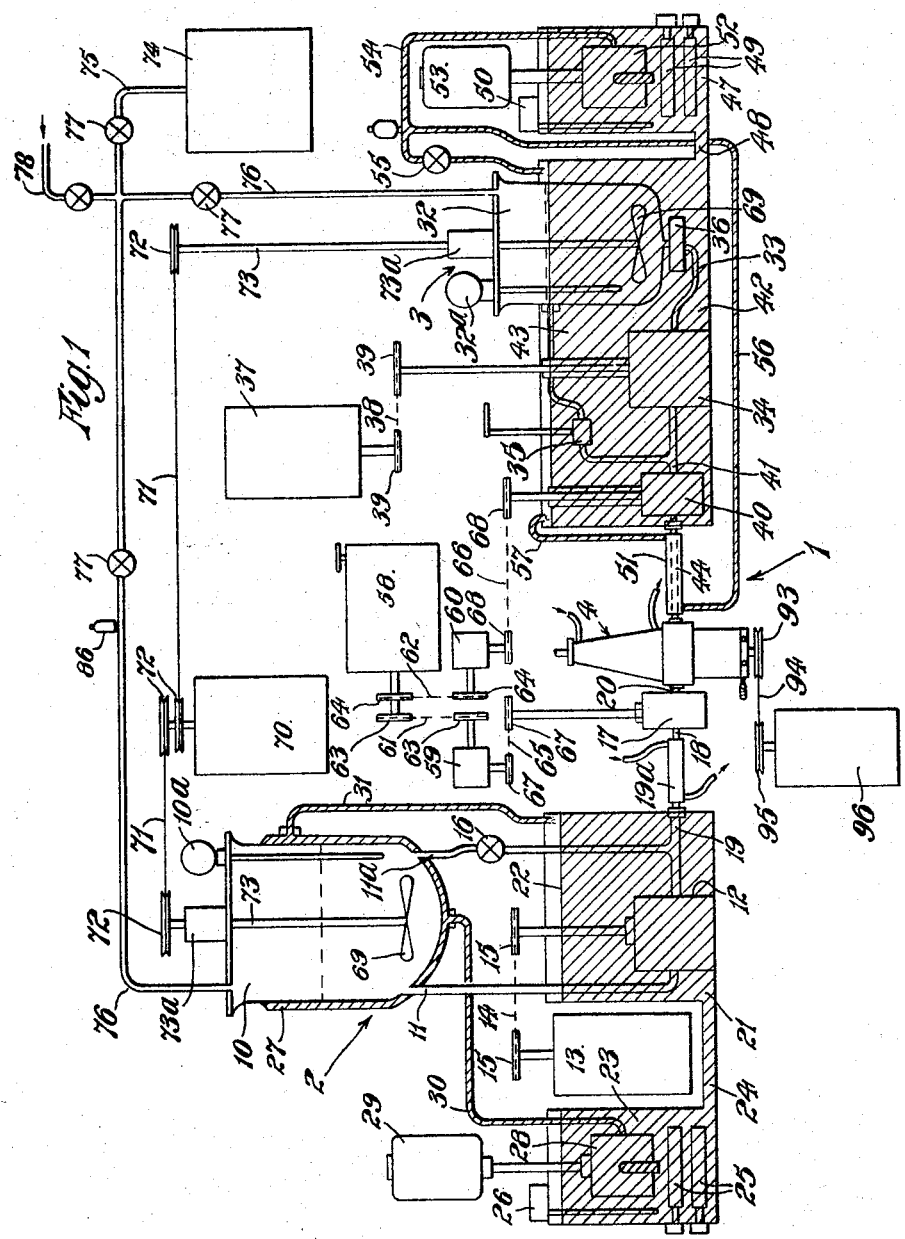
FIGURE 1 is a diagrammatic cross-sectional view of part of an apparatus according to the invention for use in the manufacture of golf balls.

The apparatus shown in the drawings is for the manufacture of golf balls which are externally covered, the covers being made of polyurethane. The apparatus will initially be described generally and then in greater detail.

In FIGURE 1 is shown a mixing unit 1 for the pretreatment and mixing of a curable material and a cross-linking agent which are, respectively, polyurethane prepolymer and methylene bis (orthochloroaniline) which will hereinafter be referred to as MOCA.

The pretreatment and supply of the prepolymer and the MOCA are carried out, respectively, in two separate units 2 and 3, the prepolymer and the MOCA being de-aerated and then being fed into a mixing apparatus 4. The mixture of the two components is fed into golf balls pre-forming moulds 5 (FIGURE 7) which are located in a mould injection station 6 (FIGURES 3, 5 and 6), the moulds being fed in succession to the injection station from a vertical magazine 7 (FIGURES 3, 4 and 5) by a feeding means 8. Means 9 are provided for removing filled moulds from the mould injection station to a pre-curing oven (not shown) for pre-curing the golf balls. After pre-curing the golf balls are located in a second and final mould for providing each ball with its desired final shape and for completely curing the ball.

The apparatus will now be described in greater detail.

*Pretreatment and supply of prepolymer*

The unit 2 comprises a closed container 10 for containing the prepolymer, the container being connected at its base, by means of a flow pipe 11, to the intake of a gear-type recirculatory pump 12, which is immersed within silicone liquids 22 contained within a bath 21, the silicone liquid forming a heating fluid which is heated by means to be described, for raising and maintaining the temperature of the prepolymer at 35° C. The pump 12 is drivable by an electric motor 13 through an endless chain 14 extending around two sprockets 15. An outlet 11a of the pipe 11 from the pump is fed back to the container 10 through a throttling valve 16. A gear-type metering feed pump 17 is connected on its inlet side by a supply pipe 18 to a branch 19 in the outlet 11a of the pipe 11 on the higher pressure side of the throttling valve 16, i.e. between the valve 16 and the pump 12, the branch extending through the wall of the bath 21. A water jacket 19a is provided around the portion of the branchpipe 19 which lies outside the bath 21 for the circulation of heated water around the pipe to maintain the temperature of prepolymer passing to the mixing apparatus. The output side of the pump 17 is connected by a pipe 20, which is kept as short as possible, to an inlet 46 (see FIGURE 2) provided in the mixing apparatus 4. The throttling valve is manually adjustable to give an adequate pressure to the liquid entering the metering pump, in order to avoid cavitation (i.e. discontinuity in the fluid in the supply line). It is of particular value when working at a high rate of flow with fluids of high viscosity.

The means for raising and maintaining the temperature of the prepolymer comprises a heat exchanger 23 connected by a passageway 24 to the bath 21 for the passage of silicone liquid therebetween. Two electrical heaters 25 are provided within the base of the heat-exchanger for heating the silicone liquid, the temperature of the liquid being maintained at a required level of 35° C. by means of a thermostat 26 extending into the fluid and connected in circuit with the electrical heaters.

Means are provided for circulating the silicone liquid around the bath 21, heat exchanger and the jacket 27 provided around the container 10, said means comprising a pump 28, drivable by an electric motor 29, which circulates the silicone liquid through a pipe 30 to the jacket, and from the jacket into the bath 21 by an outlet pipe 31.

For visually checking the temperature of the prepolymer, a thermometer 10a is provided within the container 10.

*Pretreatment and supply of cross-linking agent*

The unit 3 comprises a container 32 for the MOCA cross-linking agent, a flow pipe 33 passing from the base of the container to a position in the side of the container, a re-circulatory pump 34 connected to the flow pipe for circulating the MOCA through the tank and the flow pipe, and a throttling valve 35 positioned in the flow pipe on the outlet side of the pump 34. A strainer 36 is provided in the flow pipe between the container and the inlet side of the pump 34. The pump 34 is drivable by an electric motor 37 through an endless chain 38 passing around two sprockets 39. A gear-type metering feed pump 40, forming a supply controlling means for delivering controlled quantities of MOCA to the mixing apparatus, is connected on its inlet side to a branch pipe 41 joining the supply pipe 33 on the higher pressure side of the throttling valve 35, i.e. between the valve and the pump 34. The throttling valve is manually adjustable to give a predetermined pressure to fluid entering the pump 40. The container 3, flow pipe 33, pumps 34 and 40, valve 35 and strainer 36 are all contained within a common bath 42 and immersed within silicone liquid 43, the silicone liquid forming a heating fluid which is heated by means (to be described) for raising the temperature of the MOCA to render it liquid in form and for maintaining this temperature. The outlet side of the pump 40 is connected through a supply pipe 44 to a second inlet 45 (see particularly FIGURE 2) of the mixing apparatus, the pipe 44 extending through the wall of the bath 42. A thermometer 32a is provided within the container 32 for visually checking the temperature of MOCA within the container. The means for raising and maintaining the temperature of the MOCA comprises a heat exchanger 47 connected to the bath 42 by a passageway 48 for the passage of silicone liquid therebetween. Two electrical heaters 49 disposed in the base of the heat exchanger are provided for heating the silicone liquid to a desired temperature of 120° C., a thermostat 50 in circuit with the heaters being provided for maintaining the temperature of the silicone liquid at the desired level.

The pipe 44 lying outside the bath 42 is surrounded by a jacket 51 forming a chamber for the passage therethrough of silicone liquid to maintain the temperature of the MOCA within the pipe 44 at the desired level. Means are provided for circulating the silcone liquid from the heat exchanger to the bath 42 and the jacket 51, said means comprising a pump 52 immersed in the liquid within the heat exchanger 47 and drivable by an electric motor 53. The fluid is drivable by the pump through a pipe 54 into the top of the bath 42, a throttling valve 55 being provided in the pipe for pressurising the silicone liquid between the pump 52 and the valve 55 for forcing the fluid along a branch pipe 56 of the pipe 54, through the jacket 51 and along a pipe 57 into the bath 42.

The MOCA, which is solid at normal ambient temperature, is melted and maintained above its melting point within its container and circulatory system by the circulation of the silicone liquid. The rates at which the silicone liquid and the MOCA are circulated and the thermostatic control of the temperature within the heat exchanger are such that the formation of local regions of excessive temperature which could lead to decomposition of the MOCA are avoided.

Common driving means is provided for the pumps 17 and 40, so that a fixed ratio between the amounts of the MOCA and prepolymer simultaneously delivered can be achieved and the required mixture fed to the mixing apparatus. This driving means comprises an electric-motor-driven-continuously variable-speed-drive 58. The drive is imparted to the pump 17 through a gearbox 59 which is drivably connected to the drive 58 by an endless chain 61 extending around two sprockets 63, the pump being drivable by the gearbox through an endless chain 65 extending around sprockets 67. Similarly, another gearbox 60, drivable by the drive 58 through endless chain 62 and sprockets 64, is drivably connected to the pump 40 by an endless chain 66 passing around sprockets 68.

De-aeration and stirring of polyurethane prepolymer and MOCA

Means are provided for de-aerating the prepolymer and the MOCA, said means comprising a stirring means which in each container 10 and 32 is in the form of a blade-type stirrer 69, each stirrer being mounted at the lower end of a shaft 73 in a position where it will be immersed in the liquid, the shaft extending through the top of its associated container and being rotatably mounted therein wherein an air-tight seal 73a. Each of the stirrers is drivable by an electric motor 70 through an endless pulley belt 71 which extends around two pulley wheels 72, one of which is mounted on the motor driving shaft and the other on the shaft 73.

Means are provided for extracting air from the containers 10 and 32, said means comprising a vacuum pump 74 having an outlet pipe 75 which is connected to the interior of each container through a pipe 76, each of the pipes 75 and 76 being provided with a manually operable valve 77. A fourth pipe 78, leading into the junction of the pipes 75 and 76, is provided for introducing nitrogen into the containers 10 and 32 and the pipes 77 when the apparatus is not in use, the pressure of the nitrogen being above that of the ambient atmosphere to prevent entry of moisture into the system. A low pressure relief valve 86 is provided upon one of the pipes 76 for admission of air into the system if the pressure within the containers is reduced below a predetermined low figure.

Mixing apparatus

The mixing apparatus 4 is shown in detail in FIGURE 2 and comprises a hollow frusto-conical outer member 79 having a conical interior and a conical inner-member 80 which is disposed coaxially with the outer member, the opposed faces of the two members being separated by a space in which mixing of the prepolymer and the MOCA can be effected. The inlets 45 and 46 are provided in a flanged base 81 of the mixing apparatus and each of the inlets lead into the mixing space.

A jacket 82 surrounds the outer member along substantially its whole conical length, a chamber 83 being formed between the jacket and the outer peripheral surface of the outer member, into which an inlet pipe 84 and outlet pipe 85 lead to enable water at a suitable temperature to be circulated in the chamber so as to maintain a required steady mixing temperature in the mixing space.

A nozzle outlet 87 is screwed to the conical end of the outer member, a sealing washer 83 being provided to prevent leakage between the nozzle and the outer member. The nozzle forms an outlet for the mixture from the mixing space and is designed to engage with the inlet of a preforming mould 5 for the pre-forming of golf ball covers prior to the final moulding operation. A pipe (not shown) is provided for connecting the mixing space of the mixing apparatus with the vacuum pump 74, the pipe providing means for extracting air from the mixing space before entry of the components to be mixed, so preventing air being allowed into the resultant mixture.

The inner member is provided on its outer peripheral surface with a plurality of projections 88a in the form of studs distributed around the surface and along substantially its whole length, the projections projecting into the mixing space.

The inner member extends through the base of the outer member and is secured to a coaxial shaft 89 which is rotatably mounted within bearings 90, contained within a cylindrical housing 91 which is received in screw-threaded engagement within a cylindrical casing 92, secured to the flange 81 of the outer member to allow for rotation of the inner member within the outer member. A sealing member in the form of a rubber seal 98 is provided between the casing 92 and a cylindrical portion 99 of the inner member. The inner member is rotatable through a pulley wheel 93 (FIGURES 1 and 2), secured to the shaft 89, by means of an endless pulley belt 94 which extends around the pulley wheel 93 and around a second pulley wheel 95 (FIGURE 1) secured to the drive shaft of an electric motor 96.

The housing 91 is rotatable within its screw thread within the casing 92 by a handle 97 (FIGURE 2), so that rotation of the housing relative to the casing will cause the inner member to move axially in one direction or the other either to increase or decrease the size of the mixing space between the inner and outer members.

Moulds, mould magazine, and mould feeding and removing means

Each of the moulds 5 comprises a bottom clamp plate 100 (FIGURE 7) and a top clamp plate 101, the two plates lying parallel and being spaced-apart by two distance tubes 102 secured at one end of the plate assembly, and a third distance tube 103 secured at the other end of the plate assembly.

Mould halves 104 and 105, aligned with one another by means of a surrounding sleeve 106, are slidably mounted together with the sleeve between the clamp plates 100 and 101. The mould halves 104 and 105 are provided, respectively, with an inlet feed hole 107 and an outlet feed hole 108 to a mould cavity 111. When the mould halves are in position between the clamp plates with the sleeve in contact with the distance tubes 102 (as shown by the full lines in FIGURE 7), the inlet and outlet feed holes are aligned, respectively, with an inlet aperture 109 and outlet aperture 110 provided, respectively, in the clamp plates 100 and 101. When, however, the mould halves are slidably moved between the clamp plates into the position shown in dotted outline in FIGURE 7, with the sleeve in contact with the distance tube 103, the inlet and outlet holes 107 and 108 are not aligned with the apertures 109 and 110. In this position no mixed material may be either forced into or out of the mould cavity.

The mould cavity 111 is substantially spherical in shape for preforming covers on ready-wound golf ball cores, each mould half being provided on its ball pre-forming surface with a plurality of projecting blades 112 upon which a core can be supported so that the core is uniformly spaced from the preforming surface to enable a uniform coating to be applied to the core.

As shown in FIGURES 3 and 4, the vertical magazine 7 may contain a plurality of the moulds 5 vertically mounted one upon another, the magazine forming a means for pre-heating the moulds and being provided with an inlet 113 and outlet 114 (FIGURE 4) disposed, respectively, at the base and top of the magazine for circulation of heated air around the moulds within the magazine.

The moulds are gravity fed through an opening at the base of the magazine, baffle plates 115 (see FIGURE 5) being located within the magazine adjacent the opening to prevent loss of heat from within the magazine, the baffle plates restricting the size of the opening sufficient to just allow moulds to leave the magazine.

The means provided for feeding successive moulds from the magazine to the injection station 6 comprises a feed ram 116 which is reciprocable upon a horizontal support 117 through an opening provided between the base of the magazine and the support to push the lowest preforming mould from the base of the magazine into the injection station. The feed ram is reciprocated, for this purpose, by means of a connecting rod 118 and crank 118a which is rotatable, by means not shown, around the axis of a shaft 119. The crank is provided with an edge cam profile for the operation, simultaneously with rotation of the crank, of two supporting forks 120 (FIGURES 3 and 4) which are slidably mounted for vertical movement through holes 121 in the support 116. The forks are pivotally supported by their lower ends at one end of a lever 122, which is pivotally mounted intermediate its ends to a bracket 123 mounted upon the support, the other end of the lever carrying a cam follower 124 held in running contact with the cam by a tension spring 125. The forks 120 contact the base of the lowest preforming mould within the magazine during withdrawal of the feed ram, the forks being actuated by the cam profile and lever 122 to gently lower this mould onto the support 117 for feeding by the ram, upon its next inward movement, to the injection station.

In the injection station is provided a platform 126 (FIGURE 6) for a mould 5 to be filled with prepolymer and MOCA mixture from the mixing apparatus, the platform 126 being disposed vertically above the mixing apparatus, which is secured beneath the support 117 by supporting rods 4a, with the nozzle 87 projecting upwardly through holes 127 and 128 provided, respectively, in the support and in the platform. The platform 126 is provided on each side with a longitudinally extending raised portion 129, the raised portion being provided on their opposing surfaces with shoulders 130 for overlying the base plate 100 of a mould located upon the platform (as shown in FIGURE 6, in which a bottom clamp plate 100 only of a mould is shown) to prevent lifting of the mould during injection of a mixture into the mould from the mixing apparatus. Clearance is provided between the shoulders 130 and the supporting surface of the platform for sliding movement of the bottom clamp plate during feeding of a mould onto the platform by the ram 116 and to enable the centering of the inlet hole of the bottom plate of the mould upon the nozzle 87.

The platform is mounted at its sides upon two vertical rods 131 which are slidably received through holes 132 in the support 117, the rods being connected to the piston rod of a pneumatic cylinder and piston mechanism 133 by a horizontal bar 134 for moving the rods and the platform vertically. Abutments 135 and 136 are provided on each rod for contacting the support 116, respectively, to limit the degree of movement of the platform between an upper position for receiving moulds from the magazine 7 as shown in FIGURE 6, and a lower position wherein the nozzle 87 is inserted within the inlet aperture 109 of a mould mounted upon the platform for an injection operation.

A limit switch 140 (FIGURE 3) is energised by the ram 116 when the ram reaches the end of a stroke in which it pushes a mould onto the platform 126, the switch 140 operating an electro-pneumatic relay to operate the cylinder and piston mechanism 133 to lower the platform and the mould.

A limit switch 137 (FIGURE 6) is disposed adjacent the lower end of one of the rods 131 for actuation by the bar 134 when a platform has reached its lower position, to operate the drive 58 for simultaneously driving the pumps 17 and 40 to supply prepolymer and MOCA to the mixing apparatus.

As shown in FIGURE 5, a cut-off ram 138 is mounted alongside the injection station, the ram being operated by a cam 139 so that the head of the ram contacts the sleeve 106 of a mould located in the injection station so as, at the appropriate moment, to slide the sleeve and mould halves between their associated plates and move them out of alignment with the apertures 109 and 110 and the feed and outlet holes 107 and 108. Simultaneously with this movement, a limit switch 141 (FIGURE 7) is operated by the ram to stop the drive 58 to pumps 17 and 40 and thereby stop the supply of prepolymer and MOCA to the mixing apparatus. Rotation of the cam 139 is synchronised with movement of the ram 116 and operates the ram 138 after a sufficient time to allow for the filling of a mould. After operation of the switch 141, the ram continues to move until it operates another limit switch 142 which operates the electro-pneumatic relay to operate the piston and cylinder mechanism 133 to raise the platform 126.

Means are provided for removing filled moulds from the injection station, said means comprising, as shown in FIGURES 3 and 5, continuously moving conveyor 143 which removes filled moulds, which are displaced from the injection station by succeeding moulds pushed onto the platform 126 into the injection station by the ram 116.

The conveyor carries the preforming moulds, one by one, into a curing oven (not shown) in which the covered preformed balls are partially cured.

*Operation of the apparatus*

Initially, a plurality of pre-curing moulds 5, are stacked within the magazine 7, each mould containing a golf ball core 144 as shown in FIGURE 3. One of the moulds is lowered by the forks 120 during rotation of the cam 118a, as has been described, while the ram 116 is in a retracted position, the ram then moving forward upon continued rotation of the cam to slide the mould along the support 116 onto the platform 126 and into the injection station, the bottom clamp plate of the mould being held beneath the shoulders 130 as shown in FIGURE 6. At the end of its outward stroke, the ram 116 operates the limit switch 140, as shown in FIGURE 3, which operates the pneumatic piston and cylinder assembly (FIGURE 6), as has been described, to lower the platform 126 and the mould carried therein. During lowering of the platform, the nozzle 87 of the mixing apparatus locates with the inlet aperture of the base plate, the mould being slidably moved if necessary by the movement of the nozzle within the aperture to correctly align the nozzle and the aperture. At the lower limit of movement, the bar 134 energises the switch 137 which operates the continuously variable speed drive 58 to operate the supply metering pumps 17 and 40.

Polyurethane prepolymer and MOCA cross-linking agent contained, respectively, within the containers 10 and 32 and made substantially bubble-free by the action of the de-aerating means described above, and raised, respectively, to temperatures of 35° C. and 120° C. by heated silicone liquid circulating around the parts of the apparatus containing the prepolymer and MOCA, is fed through the pumps 17 and 40 into the mixing apparatus 4, the proportion of polyurethane to MOCA being controlled by the ratio of speeds of the feed pumps 17 and 40 which is controlled by the common continuously-variable-speed-drive as described above.

The increased pressure which is maintained on the inlet side of the polyurethane pre-polymer metering feed pump 17 by the recirculatory pump 12 in conjunction with the throttling valve 16, and the increased pressure which is similarly maintained on the inlet side of the MOCA metering feed pump 49, together with the careful temperature control of both ingredients assists in accurate metering, and also in the case of the MOCA, prevents blockages in the pipes by avoiding solidification due to too low a temperature on the one hand or decomposition due to prolonged exposure to a high temperature on the other.

The polyurethane and MOCA enter the mixing apparatus, respectively, through inlets 46 and 45 (FIGURE 2), mixing of the components occurring within the mixing space formed between the inner and outer members of the mixing apparatus. The mixing apparatus is continuously supplied with water at about 15° C. which flows around the chamber 83 to prevent the temperature within the moving space from rising above 35° C., thus ensuring efficient mixing of the polyurethane and the MOCA. Rotation of the inner member 80 causes the projections 88 to sweep through the mixing space and mix the two components despite the fact that one is of a relatively high and the other of a relatively low viscosity.

The mixed polyurethane prepolymer and MOCA are injected from the mixing apparatus through the nozzle 87 into the mould cavity 111 (FIGURE 7), so as to fill the mould completely and surround the golf ball core 144. Complete filling of the mould is indicated by the appearance of a small quantity of the mixed composition at the outlet aperture 110 in the top mould plate. The cut-off ram 138 is then moved forward by cam 139 to move the mould halves and sleeve 106 into the position shown in dotted outline in FIGURE 7, and move the inlet holes 107 and 108 out of alignment with the apertures 109 and 110. Simultaneously with this movement, limit switch 141 is operated by the ram 138 to stop the drive 58 to the pumps 17 and 40 to cut the supply to the mixing apparatus. Limit switch 142 is then operated to raise the platform 126 to remove the mould from the nozzle 87, and the cut-off ram is removed.

The ram 116 is then retracted and a succeeding mould 5 is lowered from the magazine. The ram 116 moves forward, pushing the succeeding mould into the injection position upon the platform 126, the filled mould being pushed out of the injection station onto the conveyor 143 as shown in dotted outline in FIGURE 5. The pre-forming moulds are, therefore, fed into the injection station, one by one, to be removed in succession after filling along the conveyor 143.

The filled pre-forming moulds are then fed by the conveyor to the pre-curing oven.

After the pre-curing operation, the pre-forming moulds are cooled to about 15° C. and each coated pre-formed ball is taken from its preforming mould and located in a second and final mould (not shown) carrying an internal matrix to provide the appropriate pattern on the ball, the mould being closed upon the pre-formed ball and transferred to an oven for a final moulding and curing operation.

Having now described our invention, what we claim is:

1. Apparatus for the manufacture of articles from curable material comprising a first container for liquid curable material, a mixing apparatus, a pump connected to the first container and to the mixing apparatus for supplying curable material from the container to the mixing apparatus, a second container for a cross-linking agent, means for continuously circulating said cross-linking agent from and to said container under a controlled pressure drop which comprises a recirculation pump having inlet and outlet ends connected to the flow pipe for circulating the cross-linking agent continuously from and to said second container and a throttling valve in the flow pipe between the delivery end of the pump and the outlet end of the flow pipe to provide a pressure drop in the said flow pipe, a supply pipe connected at one end to the mixing apparatus and at the other end to the flow pipe at a position between the throttling valve and the recirculation pump, means associated with the second container for raising the temperature of the cross-linking agent to render it liquid in form and for maintaining this temperature in said second container and in said flow pipe and supply pipe and a pump located in the supply pipe for delivering controlled quantities of cross-linking agent through the supply pipe to the mixing apparatus.

2. Apparatus according to claim 1 wherein a common driving means is drivably connected to the pumps for supplying the curable material and the cross-linking agent to the mixing apparatus.

3. Apparatus according to claim 1 provided with air extracting means connected to the interior of the second container, and stirring means within the container for immersion in the cross-linking agent contained therein.

4. Apparatus according to claim 1 provided with a curable material flow pipe having inlet and outlet ends each of which is connected to the first container, a recirculatory pump having inlet and outlet ends connected to the flow pipe for recirculating the curable material, and a throttling valve in the flow pipe between the outlet ends of the recirculatory pump and the flow pipe to throttle the flow of curable material back to the first container.

5. Apparatus according to claim 1 provided with air extracting means connected to the interior of the first container, and stirring means within the first container for immersion in the curable material contained therein.

6. Apparatus according to claim 1 provided with air extracting means connected to the interior of the mixing chamber.

References Cited by the Examiner

UNITED STATES PATENTS

| | | | |
|---|---|---|---|
| 1,855,548 | 4/1932 | Forster | 259—8 |
| 2,862,239 | 12/1958 | Pollard et al. | 18—30 |
| 2,957,203 | 10/1960 | Marshall | 18—30 |
| 2,958,516 | 11/1960 | Wall et al. | 259—8 |
| 3,056,661 | 10/1962 | Breer et al. | 259—4 |
| 3,076,637 | 2/1963 | Moziek et al. | 259—8 |
| 3,164,374 | 1/1965 | Ralph | 259—8 |

WALTER A. SCHEEL, *Primary Examiner.*

MAURICE A. BRINDISI, *Examiner.*

WILBUT L. McBAY, ROBERT W. JENKINS,
*Assistant Examiners.*